(12) United States Patent
Wenninger et al.

(10) Patent No.: US 6,565,703 B2
(45) Date of Patent: May 20, 2003

(54) ADHESIVE TAPE PARTICULARLY FOR PACKAGING USE

(75) Inventors: Dieter Wenninger, Hamburg (DE); André Galle, Geesthatcht (DE); Thomas Monschein, Durbach (DE)

(73) Assignee: tesa AG, Hamburg (DE)

( * ) Notice: Subject to any disclaimer, the term of this patent is extended or adjusted under 35 U.S.C. 154(b) by 0 days.

(21) Appl. No.: 09/988,544

(22) Filed: Nov. 20, 2001

(65) Prior Publication Data

US 2002/0106508 A1 Aug. 8, 2002

(30) Foreign Application Priority Data

Dec. 1, 2000 (DE) .......................... 100 59 875

(51) Int. Cl.$^7$ .............................. C09J 107/02
(52) U.S. Cl. .................... 156/338; 428/492; 524/270
(58) Field of Search ................. 156/315, 316, 156/324, 327, 334, 338; 206/411; 428/349, 353, 354, 355 R, 492; 524/270

(56) References Cited

U.S. PATENT DOCUMENTS

| | | | |
|---|---|---|---|
| 4,374,883 A | * | 2/1983 | Winslow ..................... 428/212 |
| 4,755,550 A | * | 7/1988 | Shuman et al. ............. 524/270 |
| 5,427,850 A | * | 6/1995 | Gotoh et al. .......... 428/355 BL |
| 5,667,858 A | * | 9/1997 | Pokorny ..................... 428/343 |
| 5,728,759 A | * | 3/1998 | Pike ............................ 524/270 |
| 5,807,918 A | * | 9/1998 | Carter ........................ 524/495 |
| 6,316,573 B1 | * | 11/2001 | Klauck et al. ........... 156/331.4 |

FOREIGN PATENT DOCUMENTS

| | | | |
|---|---|---|---|
| CA | 698518 | 11/1964 | ................... 117/25 |
| EP | 0 096 841 A1 | 12/1983 | .............. C09J/7/02 |
| EP | 0 688 843 A1 | 12/1995 | .............. C09J/7/02 |
| EP | 0 960 923 A1 | 12/1999 | .......... C09J/107/02 |
| WO | WO 94/24221 | 10/1994 | .......... C09J/201/00 |

OTHER PUBLICATIONS

Patent Abstracts of Japan, publication No. 56–030481, publication date Mar. 27, 1981 of application #54–105430, of Nitto Electric Ind Co Ltd.

English–language counterpart to EPO 960 923 A1 (Specification—U.S. Ser. No. 09/320,097, filed May 26, 1999).

* cited by examiner

*Primary Examiner*—Richard Crispino
*Assistant Examiner*—Sing P. Chan
(74) *Attorney, Agent, or Firm*—Norris McLaughlin & Marcus

(57) ABSTRACT

A unilaterally self-adhesively coated adhesive tape, comprising a. a film based on oriented polyolefins, in which that side of the film remote from the adhesive layer exhibits no surface treatment, b. an adhesive layer applied to one side of the film, prepared from a mixture comprising
from 35 to 70% by weight of a natural rubber latex,
from 20 to 65% by weight of a resin dispersion based on a hydrocarbon resin, and
from 0.5 to 20% by weight of a resin dispersion based on a rosin or on a derivative of a rosin.

10 Claims, No Drawings

ADHESIVE TAPE PARTICULARLY FOR PACKAGING USE

The invention relates to an adhesive tape comprising a polyolefin-based backing unilaterally coated with a solvent-free adhesive composition based on natural rubber latex and to the use of said adhesive tape as packaging tape.

Adhesive tapes with films based on polyolefins, such as biaxially oriented polypropylene, for example, and adhesive compositions based on solvent-containing natural rubber or aqueous acrylate dispersions are known and are supplied by known manufacturers.

A description is given, for example, in "Packaging Tapes" by Stefan Röber in Handbook of Pressure Sensitive Adhesive Technology, Third Edition, edited by Donatas Satas, Satas & Associates, Warwick, Rhode Island pp. 787–814. Further descriptions can be found in European Adhesives & Sealants 10(4), 1993, 29, by G. Pedala, and European Adhesives & Sealants 2(2), 1985, 18, by R. W. Andrew.

Owing to the known disadvantages associated with the production of solvent-containing adhesive tapes, such as, for example, the difficulty of recycling solvents, the emission of solvent to the environment, the workplace hazard due to highly flammable solvents, and the restriction on coating speed imposed by the drying of the adhesive composition, solvent-free technologies for producing adhesive tapes are advancing in importance.

A disadvantage to add to the above-described problems of the solvent technology is the need to break down the natural rubber during the production of the adhesive composition, in a process known as mastication. This results in the adhesive composition having a cohesiveness which decreases markedly in accordance with the extent of breakdown under mechanical load.

The deliberate industrial process of breaking down rubber under the combined action of shear stress, temperature, and atmospheric oxygen is referred to in the technical literature as mastication and is generally carried out in the presence of chemical auxiliaries, which are known from the technical literature as masticating agents or peptizers, or, more rarely, as "chemical plasticizing aids". In rubber technology, the mastication step is needed in order to make it easier to integrate the additives.

According to Römpp (Römpp Lexikon Chemie—Version 1.5, Stuttgart/New York: Georg Thieme Verlag 1998) mastication is a term used in rubber technology for the breaking down of long-chain rubber molecules in order to increase the plasticity and/or reduce the (Mooney) viscosity of rubbers. Mastication is accomplished by treating, in particular, natural rubber in compounders or between rolls at very low temperatures in the presence of masticating agents. The high mechanical forces which this entails lead to the rubber molecules being "torn apart", with the formation of macro radicals, whose recombination is prevented by reaction with atmospheric oxygen. Masticating agents such as aromatic or heterocyclic mercaptans and/or their zinc salts or disulfides promote the formation of primary radicals and so accelerate the mastication process. Activators such as metal (iron, copper, cobalt) salts of tetraazaporphyrins or phthalocyanines permit a reduction in the mastication temperature. In the mastication of natural rubber, masticating agents are used in amounts from about 0.1 to 0.5% by weight in the form of masterbatches, which facilitate uniform distribution of this small amount of chemicals in the rubber mass.

Mastication must be clearly distinguished from the breakdown known as degradation which occurs in all of the standard solvent-free polymer technologies such as compounding, conveying, and coating in the melt.

Degradation is a collective term for different processes which alter the appearance and properties of plastics. Degradation may be caused, for example, by chemical, thermal, oxidative, mechanical or biological influences or else by exposure to radiation (such as (UV) light). Consequences are, for example, oxidation, chain cleavage, depolymerization, crosslinking, and/or elimination of side groups of the polymers. The stability of polymers toward degradation may be increased by means of additives: for example, by adding stabilizers such as antioxidants or light stabilizers.

The use of adhesive compositions of this kind based on natural rubber hotmelt pressure-sensitive adhesives for adhesive tapes, especially packaging tapes, for sealing cartons made from recycled paper, or cardboard packaging, results in premature opening of the cartons. If there is sufficiently great tension across the lid of the carton, caused by the pressure of the packaged material in the carton or by the tension of the packaging material, which opposes sealing, the adhesive tape becomes detached from the surface of the carton and the carton opens as result of slippage of the packaging tape.

The cohesion and, with it, the packaging security afforded by adhesive tapes with an adhesive composition based on natural rubber may be improved either by crosslinking the rubber adhesive composition and/or by means of a variant preparation of the adhesive composition in the course of which the natural rubber used is broken down to a much-reduced extent and therefore has a higher molecular weight. This makes it possible to counter slippage of the adhesive tapes on the carton surface, as described above.

Solvent-free technologies for producing adhesive tapes, especially packaging tapes, have to date been restricted to the use of adhesive composition based on acrylate dispersions and to the use of melting, thermoplastic elastomers.

An advantage of these thermoplastic elastomers, predominantly block copolymers containing polystyrene blocks, is the relatively low softening point and the corresponding simplification of the application or coating process, and also the avoidance of the above-described disadvantages of the solvent-based technologies.

The unfavorable aging behavior and the profile of properties of such packaging tapes at elevated temperatures, the poor thermal stability, lead to premature opening of the cartons packaged with these tapes and/or a packaging tape performance profile which generally has some adverse features. Moreover, the process temperatures, which are very high in some cases, are detrimental to certain types of adhesive composition.

Further solvent-free systems based on aqueous adhesives, such as adhesive systems based on polyvinyl acetate, polyvinyl acetate-ethylene copolymers, neoprene, styrene-butadiene, polyurethane and polyvinyl alcohol, for example, are used little if at all owing to a price and/or performance structure which is unfavorable for adhesive tapes, particularly packaging tapes.

An overview of the most important aqueous adhesive systems and also their use is given in "Solvent free adhesives", T. E. Rolando (H. B. Fuller) in Rapra Rev. Rep. 1997, 9(5), 3–30 Rapra Technology Ltd.

Various routes to the solvent-free preparation and processing of pressure-sensitive rubber adhesives are known.

An overview of such adhesive compositions and their use in the field of pressure sensitive adhesives (PSAs) is given in "Natural Rubber Adhesives" (G. L. Butler in Handbook of Pressure Sensitive Adhesive Technology, Third Edition, edited by Donatas Satas, Van Nostrand Reinhold New York, pp. 261–287).

All of the known processes are characterized by very extensive rubber breakdown. For the further processing of the compositions for self-adhesive tapes, this necessitates extreme crosslinking conditions and also has the consequence of an application profile which is to some extent restricted, especially as regards the use of resultant self-adhesive tapes at relatively high temperatures.

Solvent-free hotmelt PSAs based on nonthermoplastic elastomers, such as natural rubber or other high molecular weight rubbers, for example, lack sufficient cohesion for the majority of applications, in the absence of a step of crosslinking the adhesive composition, and are therefore unsuited to use in the context of an adhesive packaging tape. The reason for this failure of noncrosslinked adhesive compositions based on natural rubber is the relatively large reduction in molecular weight as a result of processing, and/or as a result of the preparation process of the adhesive compositions based on natural rubber, and the resultant reduced or inadequate cohesion of the adhesive compositions.

CA 698 518 describes a process for achieving production of a composition by adding high proportions of plasticizer and/or by simultaneously strong mastication of the rubber. Although this process can be used to obtain PSAs having an extremely high tack, the achievement of a user-compatible shear strength is possible only to a limited extent, even with a relatively high level of subsequent crosslinking, owing to the relatively high plasticizer content or else to the severe breakdown in molecular structure of the elastomer to a molecular weight average of $M_w \leq 1$ million.

The use of polymer blends, where besides nonthermoplastic natural rubber use is also made of block copolymers, in a ratio of approximately 1:1, represents essentially an unsatisfactory, compromise solution, since it results neither in high shear strengths when the self-adhesive tapes are used at relatively high temperatures nor in significant improvements on the properties described in CA 698 518.

Raw natural rubber latex is supplied from the plantations and is purified, preserved, and concentrated by means of appropriate methods. A general description of the types of latex and methods of processing is given in "Naturkautschuk—Technisches Informationsblatt" [Natural rubber—technical information sheet], Malaysian Rubber Producers Research Association, L1, 1977, and in "Kautschuktechnologie" [Rubber technology], Werner Hofmann, Gentner Verlag, Stuttgart p. 51 ff.

Natural rubber latex is harvested as a natural product from trees known as latex trees. After various processing steps for separation and purification, four basic types of natural rubber latices are distinguished:
1. Standard natural rubber latex with a high ammonia content of 0.7% by weight
2. Natural rubber latex with a low ammonia content of 0.2% by weight in combination with zinc oxide and tetramethylthiuram disulfide <0.035% by weight
3. Natural rubber latex doubly centrifuged, of particularly high purity
4. Natural rubber latex partly vulcanized, for specialty applications Mastication and the associated breakdown of the natural rubber is not necessary when preparing adhesive compositions based on natural rubber latex, since in the case of the solvent-free aqueous adhesive composition the simple mixing of the components is not accompanied by mastication and thus by a breakdown of the molecule under mechanical load. This results in a close interlooping of the natural rubber latex/isoprene molecules, a high molecular weight owing to absence of mastication, a broad molecular weight distribution, and a low softening point $T_g$.

These factors result in a very good balance between cohesion and adhesion in the adhesive composition resulting from resin blends, and also in a profile of properties which is of very high performance for adhesive tapes, over a very wide temperature range.

These positive characteristics over a wide temperature range are exploited for the adhesive tape described in JP 56 030 481, comprising an adhesive composition based on natural rubber latex. Through the use of the natural rubber latex, a robustness to impact at low temperatures is described.

A further point is that natural rubber latex features a particularly wide spectrum of applications. Thus natural rubber latex is suitable on the one hand for use as an adhesive composition for packaging materials and on the other hand for applications outside of adhesive technology.

A disadvantage of adhesive composition systems based on natural rubber latex is the poor stability of the natural rubber latex raw material to mechanical load and the associated coagulation of the natural rubber latex in the adhesive composition. This sensitivity to shearing restricts the ease of handling and the usefulness of the natural rubber latex for adhesive composition technology and the adhesive tape industry. The production of adhesive tapes wherein the adhesive composition comprising natural rubber latex can be coated at high speed onto a film is not known.

Through the use of stabilizing resin dispersions and/or surface-active substances, such as emulsifiers, for example, it is possible to increase significantly the stability of the natural rubber latex. However, increasing the stability of natural rubber latex using surface-active substances at high concentrations goes hand in hand with a drastic loss of cohesion of the adhesive composition, with the consequence that adhesive compositions modified in this way cannot be used for packaging tapes.

The general use of natural rubber latex for adhesive compositions and also latex-stabilizing resin dispersions is described in "Tackified waterborne adhesive for PSA tapes", J. G. de Hullu, European Adhesives & Sealants, 12 (1998), p. 11–12. Through the use of such natural rubber latex-stabilizing resin dispersions, it becomes possible to process or coat adhesive compositions based on natural rubber latex. The trouble-free application of the dispersion adhesive compositions to a polymeric backing enables an industrially practicable and economically rational adhesive tape production process. The use of this technology is made possible by employing a suitable adhesive composition and by technically setting and optimizing the coating lines.

The application and development of an adhesive tape which unwinds quietly and is suitable for packaging applications has not been described in this context. The use of adhesive tapes with quiet unwind, particularly for carton sealing, however, is of great importance within the packaging industry in order to reduce the noise load in the packing houses and hence to increase work performance. The capacity for quiet unwinding is of fundamental importance in order to position an adhesive packaging tape within the middle to top price/performance segment.

Resin dispersions based on rosins and/or their derivatives are used for a large number of water borne polymers. In particular, rosin esters find application here. In general, there is an increase in the adhesion properties on the surfaces. The softening point of the corresponding rosin or derivative may be selected accordingly. In the adhesive tape segment, these resin dispersions serve as tackifiers for the respective adhesive compositions, in order to optimize the adhesion properties on different surfaces, and are therefore used in combination with corresponding hydrocarbon resin dispersions (principal resin component).

In general terms, natural rubber latex is a known component of adhesive compositions and is described, inter alia, in patents. The fields of use of such adhesive compositions based on natural rubber latex are applications in the sector of labels and plaster technology.

The preparation of aqueous adhesive compositions based on natural rubber latex is known. These adhesive compositions are used as described above for producing self-adhesive labels. This is done using the customary methods of preparing dispersion adhesives.

The preparation of adhesive composition systems which comprise natural rubber latex is likewise described in EP 0 960 923 A1. This discloses not only the preparation of dispersion adhesive compositions but also the incorporation of natural rubber latex into other natural rubber adhesive systems using compounders, mixers or extruders. The adhesive compositions prepared in this way may be coated onto film or nonwoven. An improvement in the packaging properties of such adhesive tapes by means of a controlled, enduring crosslinking of the adhesive composition, which also may be used as part of a rational production process, has not been described.

When using adhesive composition variants based on natural rubber latex it is the case—as already set out above—that enduring crosslinking is unnecessary for achieving good packaging qualities that are superior to the majority of other adhesive composition systems.

Through the use of the above-described stabilizing resin dispersions and also by using natural rubber latex, and accordingly in the absence of any mechanical breakdown of the rubber whatsoever, it is possible to prepare, process, and apply adhesive compositions based on natural rubber latex and thus to produce adhesive tapes, since the adhesive composition possesses very high cohesion and hence optimum packaging security.

Not only for adhesive packaging tapes for sealing cartons but also for other adhesive packaging tapes, such as strapping tapes, therefore, the natural rubber-based adhesive composition must have sufficient cohesion.

In the case of the natural rubber adhesive compositions, the adhesive tapes are provided with a reverse-face coating in order to reduce the unwind force. This coating of the reverse face is necessary in order to prevent overstretching of the backing during application. Without a reduction in unwind force by reverse-face coating, the backing becomes overstretched during rapid unwind, owing to excessive unwind forces, and this significantly impairs the packaging security. Moreover, reverse-face-coated adhesive tapes of this kind exhibit loud and clattering unwind. Because of such unwind characteristics, adhesive tapes of this kind are suitable only for sale and use at the lower price and performance levels.

In the case of the adhesive tapes with a backing based on polyolefins, preferably polypropylene, in combination with an adhesive composition based on acrylate dispersions, quiet and clatterless unwind of adhesive tapes is achieved by surface treatment of the side of the backing that faces away from the adhesive composition. This is generally accomplished by means of corona treatment. It is described in EP 0 096 841. This corona treatment of the backing reverse face, carried out for example after coating during the cutting process, increases the unwind force of the adhesive tapes and thus prevents flaking of the adhesive composition from the backing. This flaking of the adhesive composition from the backing on the basis of the unwind process leads to loud, clattering unwind. As a result of the corona treatment of the reverse face to an appropriate extent, the adhesive tape acquires quiet unwind. The unwind force, and with it the unwind characteristics as well, are set and adjusted by appropriate corona treatment of the reverse face. At the present state of development, all adhesive tapes without reverse-face corona treatment exhibit loud unwind.

The corona treatment of the adhesive tapes is accompanied substantially by disadvantages. First, it entails an additional workstep requiring additional machinery. In the case of corona treatment during the cutting process, only cutting machines with a cutting corona can be used. In some cases this necessitates additional acquisition of machinery. Secondly, the precise extent of the corona treatment is decisive in achieving the desired effect. This brings with it a high degree of process uncertainty, necessitating increased quality control.

In the case of an inadequate corona output, the desired effect of quiet unwind is not fully achieved, and, since the resultant finished adhesive tapes cannot be aftertreated, production of reject product is the consequence. In the case of too strong a corona output, the unwind force is increased excessively, leading to backing overstretch, backing tear, or a transfer of the adhesive composition during the unwinding of the adhesive tape.

Monoaxially and biaxially oriented films based on polypropylene are used in large quantities for adhesive packaging tapes. Whereas biaxially oriented films based on polypropylene are preferred for the use of adhesive packaging tape for carton sealing, monoaxially oriented polypropylene films find application in the strapping tapes segment. These films are notable for very high tensile strength and low extension in the longitudinal direction and are highly suited to bundling and palletization. When using adhesive compositions which exhibit inadequate cohesion or inadequate anchoring of the adhesive composition to the film, the slippage of the strapping tapes results in slipping of the pallets and thus in inadequate securement of the pallets. Insufficient anchoring of the adhesive composition on the film leads, when using carton sealing tapes, to premature opening of the packed cartons.

Thermoplastic films based on polyvinyl chloride (PVC) are used to produce adhesive tapes by a variety of manufacturers. Particularly films based on PET are distinguished by high elongation at break and thermal stability of from 130° C. to 175° C., and resistance toward dilute alkalis and acids. Moreover, films based on polyesters possess a very high abrasion resistance and penetration resistance, but are less widespread in the field of adhesive packaging tapes owing to their relatively high price in relation to polyolefin-based films.

In the production of adhesive tapes with adhesive compositions based on natural rubber, both water-based and solventborne primers are used as adhesive promoters between adhesive composition and backing film. These adhesive promoters that are used possess in part a crosslinking effect on the natural-rubber-based adhesive composition which is applied from solution.

It is an object of the present invention to provide adhesive tapes comprising films based on oriented polyolefins and solventlessly prepared adhesive compositions based on natural rubber latex, said tapes exhibiting quiet unwind even at very high unwind speeds and without the need to activate by corona treatment that side of the backing of the adhesive tape that is opposite to the adhesive composition. This quiet unwind should be retained even at very high unwind speeds.

Furthermore, the adhesive tapes ought to unwind easily. Additionally, the novel adhesive tapes ought to possess outstanding suitability for use as packaging tapes for commercial cardboard packaging.

This object is achieved by means of an adhesive tape as specified in the main claim. The subclaims relate to advantageous developments of the subject matter of the invention.

Furthermore, the invention provides proposals for using the adhesive tape of the invention.

The invention accordingly provides a unilaterally self-adhesively coated adhesive tape comprising a film based on oriented polyolefins in which that side of the film remote from the adhesive layer exhibits no surface treatment.

The film is provided on one side with an adhesive layer prepared from a mixture comprising

| | |
|---|---|
| from 35 to 70% by weight | of a natural rubber latex, |
| from 20 to 65% by weight | of a resin dispersion based on a hydrocarbon resin, and |
| from 0.5 to 20% by weight | of a resin dispersion based on a rosin or on a derivative of a rosin. |

Hydrocarbon resin is a collective term for thermoplastic polymers which are colorless to intense brown in color and have a molar mass of generally <2000.

They may be divided into three main groups according to their provenance: petroleum resins, coal tar resins, and terpene resins. The most important coal tar resins are the coumarone-indene resins. The hydrocarbon resins are obtained by polymerizing the unsaturated compounds that can be isolated from the raw materials.

Included among the hydrocarbon resins are also polymers obtainable by polymerizing monomers such as styrene and/or by means of polycondensation (certain formaldehyde resins), with a correspondingly low molar mass. Hydrocarbon resins are products with a softening range that varies within wide limits from <0° C. (hydrocarbon resins liquid at 20° C.) to >200° C. and with a density of from about 0.9 to 1.2 g/cm$^3$.

They are soluble in inorganic solvents such as ethers, esters, ketones, and chlorinated hydrocarbons, and insoluble in alcohols and water.

By rosin is meant a natural resin which is recovered from the crude resin from conifers. Three types of rosin are differentiated: balsam resin, as a distillation residue of turpentine oil; root resin, as the extract from conifer rootstocks; and tall resin, the distillation residue of tall oil. The most significant in terms of quantity is balsam resin.

Rosin is a brittle, transparent product with a color ranging from red to brown. It is insoluble in water but soluble in many organic solvents such as (chlorinated) aliphatic and aromatic hydrocarbons, esters, ethers, and ketones, and also in plant oils and mineral oils. The softening point of rosin is situated in the range from approximately 70 to 80° C.

Rosin is a mixture of about 90% resin acids and 10% neutral substances (fatty acid esters, terpene alcohols, and hydrocarbons). The principal rosin acids are unsaturated carboxylic acids of empirical formula $C_{20}H_{30}O_2$, abietic acid, neoabietic acid, levopimaric acid, pimaric acid, isopimaric acid, and palustric acid, as well as hydrogenated and dehydrogenated abietic acid. The proportions of these acids vary depending on the provenance of the rosin.

Films which may be used in accordance with the invention include monoaxially and biaxially oriented films based on polyolefins, then films based on oriented polyethylene or oriented copolymers containing ethylene and/or polypropylene units.

Monoaxially oriented polypropylene is notable for its very high tensile strength and low elongation in the longitudinal direction and is used, for example, to produce strapping tapes. Monoaxially oriented films based on polypropylene are particularly preferred for producing the adhesive tapes of the invention, especially for bundling and palletizing cardboard packaging and other goods.

The thicknesses of the monoaxially oriented films based on polypropylene are preferably between 25 and 200 µm, in particular between 40 and 130 µm.

Monoaxially oriented films are predominantly single-layered, although multilayer monoaxially oriented films may also be produced in principle. The known films are predominantly one-, two- and three-layer films, although the number of layers chosen may also be greater.

For the production of the adhesive tapes of the invention, used among other things for secure carton sealing, particular preference is further given to biaxially oriented films based on polypropylene with a draw ratio in the longitudinal (machine) direction of between 1:4 and 1:9, preferably between 1:4.8 and 1:6, and a draw ratio in the transverse (cross) direction of between 1:4 and 1:9, preferably between 1:4.8 and 1:8.5.

The moduli of elasticity achieved in the machine direction, measured at 10% elongation in accordance with ASTM D882, are usually between 1000 and 4000 N/mm$^2$, preferably between 1500 and 3000 N/mm$^2$.

The thicknesses of the biaxially oriented films based on polypropylene are in particular between 15 and 100 µm, preferably between 20 and 50 µm.

Biaxially oriented films based on polypropylene may be produced by means of blown film extrusion or by means of customary flat film units. Biaxially oriented films are produced both with one layer and with a plurality of layers. In the case of the multilayer films, the thickness and composition of the different layers may also be the same, although different thicknesses and compositions are also known.

Particularly preferred for the adhesive tapes of the invention are single-layer, biaxially or monoaxially oriented films and multilayer biaxial or monoaxial films based on polypropylene which have a sufficiently firm bond between the layers, since delamination of the layers in the course of the application is disadvantageous.

The adhesion of the adhesion promoter on the thermoplastic film based on polyolefins may be improved by means of corona treatment or flame pretreatment, since, especially, the surfaces of the films based on oriented polyolefins may be treated by means of these widely known processes, such as corona treatment or flame treatment. Preference is given to surface treatments by corona treatment.

An overview of the processes for surface treatment is contained, for example, in the article "Surface pretreatment of plastics for adhesive bonding", A. Kruse; G. Krüger, A. Baalmann and O. D. Hennemann; J. Adhesion Sci. Technol., Vol. 9, No. 12, pp. 1611–1621 (1995).

The biaxially oriented films for the adhesive tapes of the invention are heavily corona- or flame-pretreated on the side facing the adhesive composition or, where present, the adhesion promoter, but are not surface-treated and/or corona- or flame-pretreated on the side remote from the composition.

In an further preferred embodiment of the invention, an adhesion promoter is present between the optionally flameor corona-treated film and the adhesive layer, and guarantees the effective bonding of the adhesive composition to the film and the crosslinking of the adhesive composition.

The adhesion promoter used optionally between adhesive composition and backing film optimizes the bond between the specified layers.

The application rate of the adhesive layer is in particular from 10 to 45 g/m². In one preferred embodiment, the application rate set is from 13 to 28 g/m².

In one particularly preferred variant, the adhesive compositions of the adhesive tapes of the invention include from 45 to 60% by weight of natural rubber latex. Also in accordance with the invention are other natural rubber latices and also mixtures of different types of natural rubber latices.

Depending on application, the following components— independently of one another—may be added to the adhesive composition;

| a) | from 0.1 to 5% by weight | of an aging inhibitor, |
| b) | from 0.05 to 5% by weight | of a defoamer, |
| c) | from 0.05 to 5% by weight, in particular from 1.0 to 3% by weight, | of an alkoxylated alkylphenol, |
| d) | from 0.05 to 20% by weight | of at least one color pigment. |

With further preference, the adhesive layer contains up to 20% by weight of at least one resin dispersion based on hydrocarbon resins having a softening point of from 20° C. to 85° C.

The adhesive composition may in particular include from 0.05 to 20% by weight and, preferably, from 2 to 15% by weight of the additional resin dispersion.

The raw material used for the adhesive tapes of the invention is preferably standard natural rubber latex with an ammonia content of 0.7% by weight, firstly because the natural rubber latex mentioned offers price advantages and secondly because its relatively high ammonia content provides the natural rubber latex with effective stabilization. Substantially, natural rubber latex is very highly suitable for the use of adhesive compositions for adhesive tapes. Owing to the latex's very high molecular weight, the interlooping of the molecule chains, low glass transition temperature, and absence of mastication during the preparation of the adhesive compositions, adhesive compositions based on natural rubber latex display an excellent balance between adhesion and cohesion.

These properties ensure a very high level of packaging security when adhesive tapes comprising a natural rubber latex-based adhesive composition are used, especially in connection with the use of critical carton types and low temperatures. The mechanical stability of the natural rubber latex may be critical with regard to mechanical shearing loads. Strong mechanical shearing loads lead to coagulation of the natural rubber latex, meaning that it cannot be processed. Possibilities for stabilizing the adhesive compositions based on natural rubber latex toward mechanical loads include firstly the use of appropriate stabilizing resin dispersions and secondly the use of emulsifiers.

The adhesive tapes of the invention preferably comprise natural rubber latex at between 35% to 70% by weight of the standard natural rubber latex with a high ammonia content.

Aqueous resin dispersions, i.e., dispersions of resin in water, are known. Their preparation and properties are described, for example, in "Resin Dispersions", Anne Z. Casey in Handbook of Pressure Sensitive Adhesive Technology, Second Edition, edited by Donatas Satas, Van Nostrand Reinhold New York, pp. 545–566.

Dispersions of hydrocarbon resins are likewise known and are offered, for example, by Hercules BV under the trade name Tacolyn.

For the adhesive tapes of the invention, resin dispersions based on hydrocarbon resins or modified hydrocarbon resins as principal resin component are used. The adhesive composition comprises between 20 to 65% by weight of the resin dispersion. The solids content of the resin dispersion is in particular between 40 and 70% by weight, preferably between 45 and 60% by weight.

The use of rosin dispersions and/or of derivatives of rosin dispersions is employed in the adhesive tape sector to optimize the adhesion properties for adhesive compositions. Through an appropriate choice of the softening point in combination with an optimized resin/natural rubber ratio it is possible to exert a positive influence on the unwind characteristics of the adhesive tapes of the invention. Accordingly, through the use of suitable rosin dispersions, the transition speeds (from quiet unwind to loud unwind) of the adhesive tapes of the invention are shifted significantly toward higher unwind speeds.

For the adhesive tapes of the invention, resin dispersions based on rosins or modified rosins are used as a secondary resin component. The adhesive composition contains between 0.5 to 20% by weight of the resin dispersion and preferably between 1.5 and 15% by weight of the resin dispersion. The solids content of the resin dispersion is in particular between 40 and 70% by weight, preferably between 45 and 60% by weight. The softening point of the rosin or of the modified rosin is between 5° C. and 60° C., preferably between 12° C. and 50° C.

Also in accordance with the invention is the use of resin dispersions based on mixtures of different hydrocarbon resins and rosins and/or on modified rosins and also on mixtures of inventive hydrocarbon resins and rosins with other resins.

Also in accordance with the invention is the use of resin dispersions based on mixtures of different hydrocarbon resins and also on mixtures of inventive hydrocarbon resins with other resins.

Likewise known are resin dispersions based on modified hydrocarbons, and of particular interest in this context are C5/C9 hydrocarbon resin dispersions which have been modified with aromatics. The polarity of the resin dispersion and thus of the adhesive composition may be adjusted by way of the proportion of aromatics. As well as the polarity of the adhesive composition, the hardness of the resin is influenced. The lower the aromatics content, the lower the polarity of the modified hydrocarbon resin dispersion.

Aging inhibitors for adhesive compositions based on natural rubber are known. Three different kinds of aging inhibitor are used in particular as antioxidants for adhesive compositions: aging inhibitors based on amines, on dithiocarbamates, and on phenols. Phenol-based aging inhibitors are very effective under the influence of UV radiation and sunlight.

For the adhesive tapes of the invention, phenol-based aging inhibitors are used. The adhesive composition comprises in particular from 0.1 to 5% by weight of an aging inhibitor based on phenols. Also in accordance with the invention is the use of other types of aging inhibitor, such as aging inhibitors based on amines and dithiocarbamates, for example.

Organic and inorganic pigments for adhesive compositions based on natural rubber are known. For the coloring of adhesive compositions based on natural rubber, use is made in particular of titanium dioxide or of titanium dioxide in combination with different-colored color pigments.

For the adhesive tapes of the invention, suitable organic and/or inorganic color pigments are used in dispersion form. The adhesive composition preferably comprises from 0.05 to 20% by weight of an organic and/or inorganic color pigment. Also in accordance with the invention is the use of pigments based on mixtures of different organic and inorganic pigments.

The use of alkoxylated alkyl phenols as plasticizers is proposed, inter alia, in "Modification of Acrylic Dispersions", Alexander Zettl in Handbook of Pressure Sensitive Adhesive Technology, Second Edition, edited by Donatas Satas, Van Nostrand Reinhold New York, p. 471. The properties of the alkoxylated alkyl phenols are determined by the alkyl radical and predominantly by the structure of the polyglycol ether chain. In one preferred embodiment, propoxylated alkyl phenol is used. Water-soluble alkoxylated alkyl phenols are preferred.

The use of alkylphenol polyglycol ethers as emulsifiers for stabilizing the natural rubber latex dispersion adhesive composition is proposed, inter alia, in "Compounding Natural Latex in water-based PSAs", Richard C. Oldack and Robert E. Bloss in Adhesive Age, April 1979, pp. 38–43.

The properties and the stabilizing effect of the alkoxylated alkyl phenols or, generally, of the polyethyleneoxyethanolate condensates are determined predominantly by the polyglycol ether chain. A correlation has been found in this context between the length of the polyglycol ether chain and the stabilizing effect on natural rubber latex.

The adhesive compositions of the invention may comprise from 0.05 to 5% by weight of alkoxylated alkyl phenol, in one preferred embodiment from 1 to 3% by weight.

The adhesive tapes of the invention may be produced by the known methods. An overview of customary production methods can be found, for example, in "Coating Equipment", Donatas Satas in Handbook of Pressure Sensitive Adhesive Technology, Second Edition edited by Donatas Satas, Van Nostrand New York, pp. 708–808. The known methods of drying and cutting the adhesive tapes are likewise to be found in the Handbook.

The adhesive tapes of the invention are suitable for a large number of adhesive tape applications. One important field of application is that of packaging applications. The adhesive tapes are suitable for use as carton sealing tapes, general adhesive packaging tapes, strapping tapes, and adhesive tapes for sealing plastic packaging and plastic bags. The adhesive tapes are suitable for pallet securement. Further applications are the bundling of loose goods and goods for transit, such as pipes, planks, etc. The adhesive tapes of the invention may be used to secure, for example, refrigerators and other electrical and electronic appliances when in transit. Further applications include label protection, surface protection, in the construction sector, for example, and tear-open strips for packaging. Applications within the office sector are also possible.

The adhesive packaging tapes have running lengths in particular of 66, 100 and 1000 m. Common roll widths chosen are 18, 24, 36, 48, 50 and 72 mm.

The preferred colors are brown, white, and transparent. Printing is carried out on rolls 144 or 150 mm in width, which are then again cut to the abovementioned widths.

The intention of the text below is to illustrate the invention, with reference to examples, without wishing unnecessarily to restrict the invention.

EXAMPLES

Example a

Film

A biaxially oriented film based on polypropylene is used, from Radici.

| | |
|---|---|
| Film thickness | 28 μm |
| Designation | Radil T |
| Company/manufacturer | Radici SpA |
| Elongation at break, MD | 130% |
| Elongation at break, CD | 50% |
| Modulus of elasticity, MD | 2500 N/mm$^2$ |
| Modulus of elasticity, CD | 4000 N/mm$^2$ |

The surface energy of the untreated BOPP film Radii T25 is less than 30 mN/m. The surface energy of the polypropylene surface which is coated with adhesion promoter is from 44 to 46 mN/m following corona treatment.

The surface energy of the untreated polypropylene surface of the film Radil T25 is less than 30 mN/m. This is the side of the film that is opposite to the adhesive composition.

Example b

Components
  Components used:

| | |
|---|---|
| b1 | of the adhesive composition |
| b1.1 | natural rubber latex obtainable from Weber & Schaer, Hamburg; (solids content 60%) |
| b1.2.1. | aqueous resin dispersion based on hydrocarbon resins (from Hercules BV, MBG193, solids content 55% by weight; softening point 70° C.) |
| b1.2.2. | aqueous resin dispersion based on an ester of a rosin (from Eka Chemicals, Worle England; Snowtack 321A; solids content 50% by weight; softening point 32° C.) |
| b.1.3. | aging inhibitor AD112 from Synthomer GmbH, Frankfurt |
| b1.4 | defoamer Foamaster 306 from Henkel, Düsseldorf |
| b2 | of the primer |
| b2.1 | Butofan LS103 (dispersion based on styrene-butadiene rubber; BASF) |

Example c

Formulations

| | | |
|---|---|---|
| c1 | formulation of the adhesive composition | |
| | The formulation is given in % by weight: | |
| | Natural rubber latex dispersion | 51% by weight |
| | MBG 193 | 43% by weight |
| | Snowtack SE 325A | 5% by weight |
| | Aging inhibitor | 0.7% by weight |
| | Defoamer | 0.3% by weight |
| c2 | formulation B of the primer | |
| | The formulation is given in % by weight: | |
| | Butofan LS103 | 100% by weight |

Example d

Preparation of the Adhesive Composition and of the Primer

The adhesive composition A to be coated is prepared as follows:

| | |
|---|---|
| d1 | the two resin dispersions are added to the natural rubber latex at 23° C. with continual stirring with a customary mechanical stirrer. This is followed by careful stirring for 15 minutes more. |
| d2 | the aging inhibitor and the defoamer are stirred carefully into the mixture from step 1 (d1). Stirring is then continued for 15 minutes. This is followed by coating. |

The primer with formulation B is prepared as follows:

| | |
|---|---|
| d3 | Butofan LS103 is used without further pretreatment. |

Example e

Coating

The film a is coated with the primer formulation B and with the adhesive composition formulation A by means of a wire doctor. In a first step the primer is applied, and briefly dried at from 80 to 90° C., and directly thereafter in a second step (inline or offline) the adhesive composition is applied to the primer layer.

The wire doctor and the coating speed are adjusted such that after drying of the coated film an adhesive application rate of approximately 18 g/m² is measured and a primer application rate of from 0.6 to 0.8 g/m² is measured. Coating takes place on a pilot coating plant with an operating width of 500 mm and at a coating speed of 10 m/min. Downstream of the coating station with its wire doctor applicator there is a drying tunnel which is operated with hot air (approximately 100° C.). The coated film is made processed in a width of 50 mm and a length of 60 m.

The technical adhesive data are determined following storage at 23° C. for two days and following storage at 23° C. for from one to three months.

Example f

Results

The test methods used are briefly characterized below:

To determine the adhesive application rate, a circular specimen of known surface area is cut from the coated film and weighed. The adhesive composition is then removed using petroleum spirit and the film, now free of adhesive composition, is weighed again. The adhesive application rate, in g/m², is calculated from the difference.

To characterize the tack with respect to cardboard, the adhesive tape is applied to the cardboard using a standard commercial manual roller and is pressed on using a steel roller weighing 2 kg (overrolled twice). After a waiting time of 3 minutes, the adhesive tape is peeled off parallel at a speed of about 30 m/min and at an angle of approximately 130° to the cardboard surface. The tack with respect to cardboard is assessed qualitatively on the basis of the amount of paper fibers torn out, in comparison with a standard commercial adhesive packaging tape such as Tesa-pack 4124 from Beiersdorf, whose tack is characterized as being very good.

To determine the packaging security a standard carton (dispatch carton; 425 mm×325 mm×165 mm: length×breadth×height: from Europakarton; constructed from bicorrugated cardboard with a 125 g/m² kraftliner outer ply) is sealed with the adhesive tape using a standard commercial automatic packer (Knecht, model 6030 and sealing unit 6230, setting without braking path). The adhesive tape is applied centrally in a standard U-shaped seal so that 60 mm of adhesive tape are bonded at each of the end faces. Before sealing, the carton is completely filled with peas and is stored lying on its side face at 40° C. and at 23° C. The packaging security is characterized as being very good if the carton remains sealed for more than 30 days. Also characterized and described are the slippage of the adhesive tape on the carton and, respectively, the behavior of the adhesive tape at the bonded areas, and these qualities are compared with the reference adhesive tape (table 1).

The unwind noise is determined with the adhesive tape being unwound at a speed of 60 m/min. The unwind noise is measured in dB (A) at a distance of 25 cm from the center of the roll of adhesive tape, using a standard commercial sound level meter from Brüel & Kjær (type 2226). A measured sound level less than 83 dB (A) is classed as quiet.

The unwind force is measured at constant unwind speed (30 m/min) by measuring the torque and calculating the unwind force, in N/cm, in accordance with the known formulae.

The results of the investigation of an inventive adhesive tape with unembossed film and its assessment in relation to comparative adhesive tapes are given in table 1.

TABLE 1

Characteristics of the adhesive tapes of the invention

| Structure/<br>storage time/<br>temperature | Sample A | Sample B<br>tesa 4024<br>with reverse-<br>face corona | Sample C<br>tesa 4024<br>without reverse-<br>face treatment |
|---|---|---|---|
| Adhesive composition | composition A | acrylate dispersion | acrylate dispersion |
| Backing | film a | film a | film a |
| Primer | formulation B | no primer | no primer |
| Adhesive application rate [g/m²] | 18–22 | 24 | 24 |
| Application rate, primer layer [g/m²] | 0.8 | — | — |
| Surface tension reverse face | ~30 mN/m | ~36–38 mN/m | ~30 mN/m |
| Anchorage of adhesive composition | good | good | good |
| Unwind behavior [loud/quiet] | quiet | quiet | loud |
| Unwind force at 30 m/min [N/cm] | 3.8 | 4.5 | 1.5 |
| Packaging security | very good | good | good |
| Tack on cardboard | good | very good | very good |

Sample A: sample of the adhesive tapes of the invention without reverse-face corona

What is claimed is:

1. An adhesive tape, comprising
   a. an oriented polyolefin film,
   b. an adhesive layer applied to one side of the film, prepared from a mixture comprising from 35 to 70% by weight of a natural rubber latex,
   from 20 to 65% by weight of a resin dispersion based on a hydrocarbon resin, and
   from 0.5 to 20% by weight of a resin dispersion based on a rosin or on a derivative of a rosin, on which that side of the film remote from the adhesive layer has no surface treatment.

2. The tape as claimed in claim 1, wherein the film is either composed of biaxially oriented polyolefins, has a thickness of between 20 and 50μm, or both.

3. The tape as claimed in claim 1, wherein the film either is composed of monoaxially oriented polypropylene, has a thickness of between 25 and 200 μm, or both.

4. The tape of claim 3, wherein said thickness is 40–130 μm.

5. The tape as claimed in claim 1, wherein a layer of a primer has been applied between the film and the adhesive layer.

6. The tape as claimed in claim 1, wherein the application rate of the adhesive layer to the film is from 10 to 45 g/m².

7. The tape as claimed in claim 1, wherein the adhesive layer contains up to 20% by weight of at least one resin dispersion based on hydrocarbon resins having a softening point of from 20° C. to 85° C.

8. The tape as claimed in claim 1, wherein the adhesive layer contains

| | |
|---|---|
| from 0.1 to 5% by weight | of an aging inhibitor, |
| from 0.05 to 5% by weight, in particular from 1.0 to 3% by weight, | of an alkoxylated alkylphenol, |
| from 0.05 to 5% by weight | of a defoamer and/or |
| from 0.05 to 20% by weight | of at least one color pigment. |

9. A method for sealing a paper package, which comprises sealing such a package with the adhesive tape of claim 1.

10. The method of claim 9, wherein said package is a carton.

* * * * *

UNITED STATES PATENT AND TRADEMARK OFFICE
CERTIFICATE OF CORRECTION

PATENT NO. : 6,565,703 B2
DATED : May 20, 2003
INVENTOR(S) : Wenninger et al.

It is certified that error appears in the above-identified patent and that said Letters Patent is hereby corrected as shown below:

Column 14,
Line 51, "50$\mu$m" should read -- 50 $\mu$m --

Signed and Sealed this

Twenty-fourth Day of May, 2005

JON W. DUDAS
*Director of the United States Patent and Trademark Office*